June 4, 1940.                J. E. HALE                2,203,617
                           PNEUMATIC TIRE
               Filed Nov. 18, 1936        4 Sheets-Sheet 1

INVENTOR
JAMES E. HALE
BY
ATTORNEY

June 4, 1940.　　　　J. E. HALE　　　　2,203,617
PNEUMATIC TIRE
Filed Nov. 18, 1936　　　4 Sheets-Sheet 2

INVENTOR
James E. Hale
BY Albert L. Ely
ATTORNEY

June 4, 1940. J. E. HALE 2,203,617
PNEUMATIC TIRE
Filed Nov. 18, 1936 4 Sheets-Sheet 3
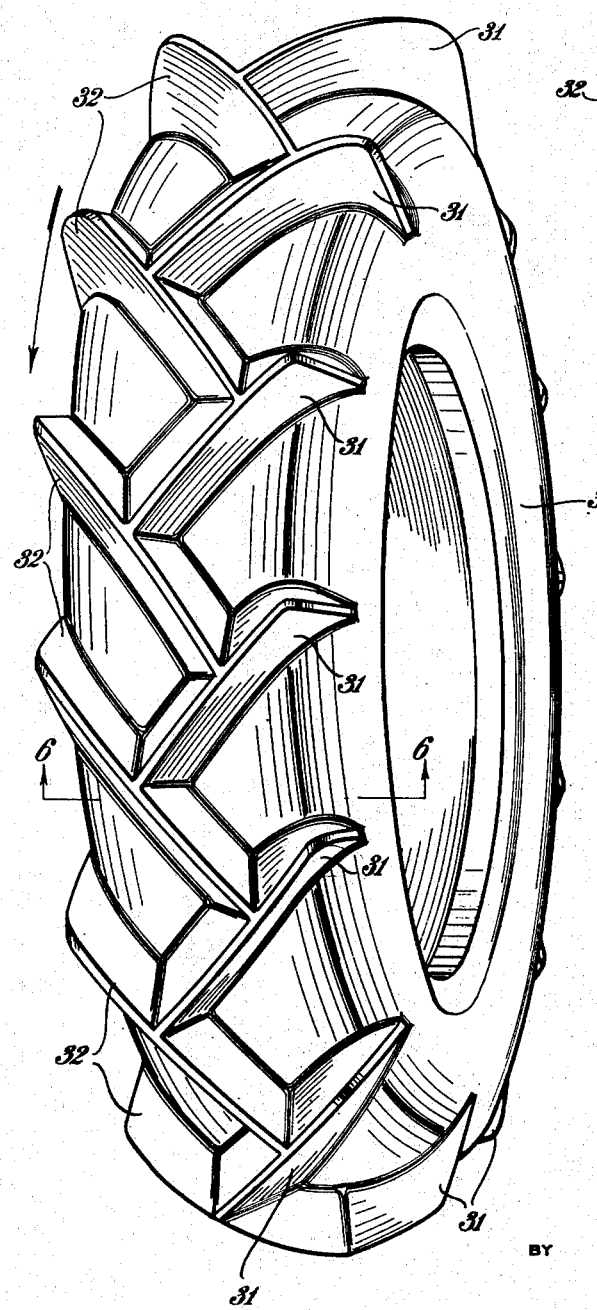
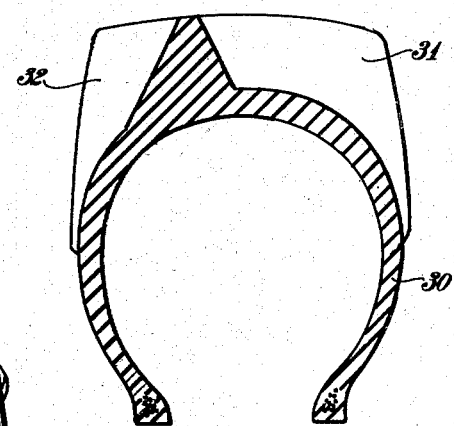
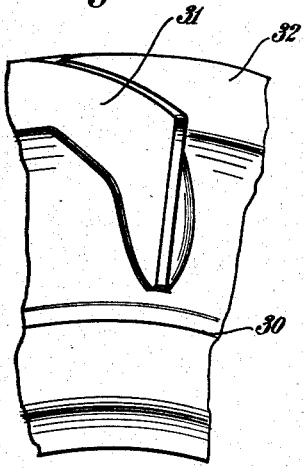
INVENTOR
James E. Hale
BY Albert L. Ely
ATTORNEY

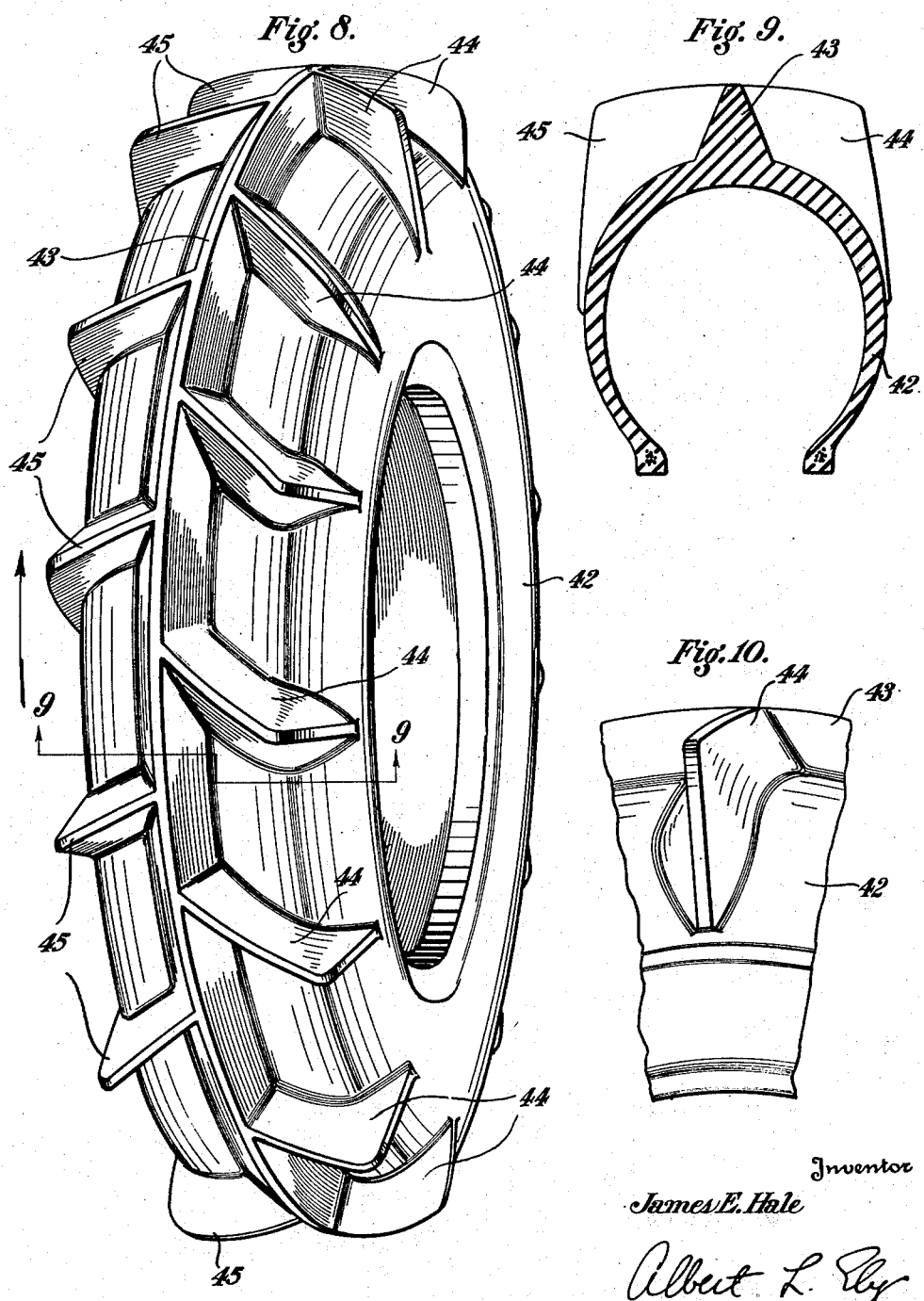

Patented June 4, 1940

2,203,617

UNITED STATES PATENT OFFICE 2,203,617

PNEUMATIC TIRE

James E. Hale, Akron, Ohio, assignor to The Firestone Tire & Rubber Company, Akron, Ohio, a corporation of Ohio Application November 18, 1936, Serial No. 111,407

16 Claims. (Cl. 152—209)

This invention relates to pneumatic tires for vehicle wheels, and more especially it relates to improved pneumatic tires for tractors used for agricultural purposes under special conditions wherein the pneumatic tires and steel tires heretofore used have been found not satisfactory.

The improved tire embodying the present invention is designed primarily for use in agricultural operations that are carried out in extremely wet or muddy ground, and even in partly submerged soils. Such conditions obtain normally in rice and sugar cane farming, and present a serious obstacle to the expeditious plowing of the land and the moving of the harvested crop therefrom. In the cane fields conditions are further aggravated by the presence of much vegetable litter, such as cane leaves and shucks, upon the ground.

Various expedients have been tried for meeting the foregoing conditions, among which may be mentioned steel wheels provided with deep spade lugs. Tractors equipped with these tires will pull through mud under some conditions, but frequently cane shuck litter on the ground mats with the muddy soil in such a way as to form great balls of mud between the cleats or lugs on the wheel, sometimes to such an extent that the tractor can no longer pull its load. Furthermore, steel-cleated wheels frequently cut through the hard pan immediately below the muddy soil, and bog down, thus causing serious loss of water at that point during the flooding season while rice is growing, and ruining that portion of the field for a year or more. Also, tractors equipped with steel wheels and spade lugs are not permitted to travel over highways and bridges with the result that their activities are confined strictly to the fields.

Another expedient that has been attempted is to equip the tractors with ordinary agrictultural pneumatic tires, and mount thereon non-skid chains equipped with deep lugs. Although such equipment provides adequate traction in deep mud, it is open to the same objections as steel wheels with cleats, namely, it cannot be used on the highways, and provides very bumpy riding. Moreover, the chains are too heavy and unwieldy to conveniently put on and take off, they cut down the power of the tractor, and frequently cause damage to the tires to which they are applied.

At the present time the cane field farmers of Louisiana have found that the only satisfactory method of hauling cane at harvesting time is by the use of mules. However, the initial cost of the mules is high, and their use is confined to a few weeks of the year. During the remainder of the year they consume fodder without performing useful service.

The chief objects of the invention are to provide improved tire equipment for hauling in deep mud or gumbo, which equipment is suitable for year round operation; to provide tractor equipment of the character mentioned that will not inflict damage upon the soil; that will not damage highways and consequently will be permitted to travel thereover; that will be self-cleaning, and for that reason always will be able to provide traction in deep mud, muck, or gumbo; that will make for easy riding; that may be used on tractors for plowing, cultivating, and other farm operations, as well as for hauling; and that is subject to flotation whereby sinking into soft soil at least is retarded. Other objects will be manifest.

Of the accompanying drawings:

Figure 5 is a perspective view of a tire constituting another embodiment of the invention;

Figure 6 is a section on the line 6—6 of Figure 5;

Figure 7 is a fragmentary side elevation of the tire shown in Figure 5;

Figure 8 is a perspective view of a tire constituting still another embodiment of the invention;

Figure 9 is a section on the line 9—9 of Figure 8;

Figure 10 is a fragmentary side elevation of the tire shown in Figure 8.

Figure 1:
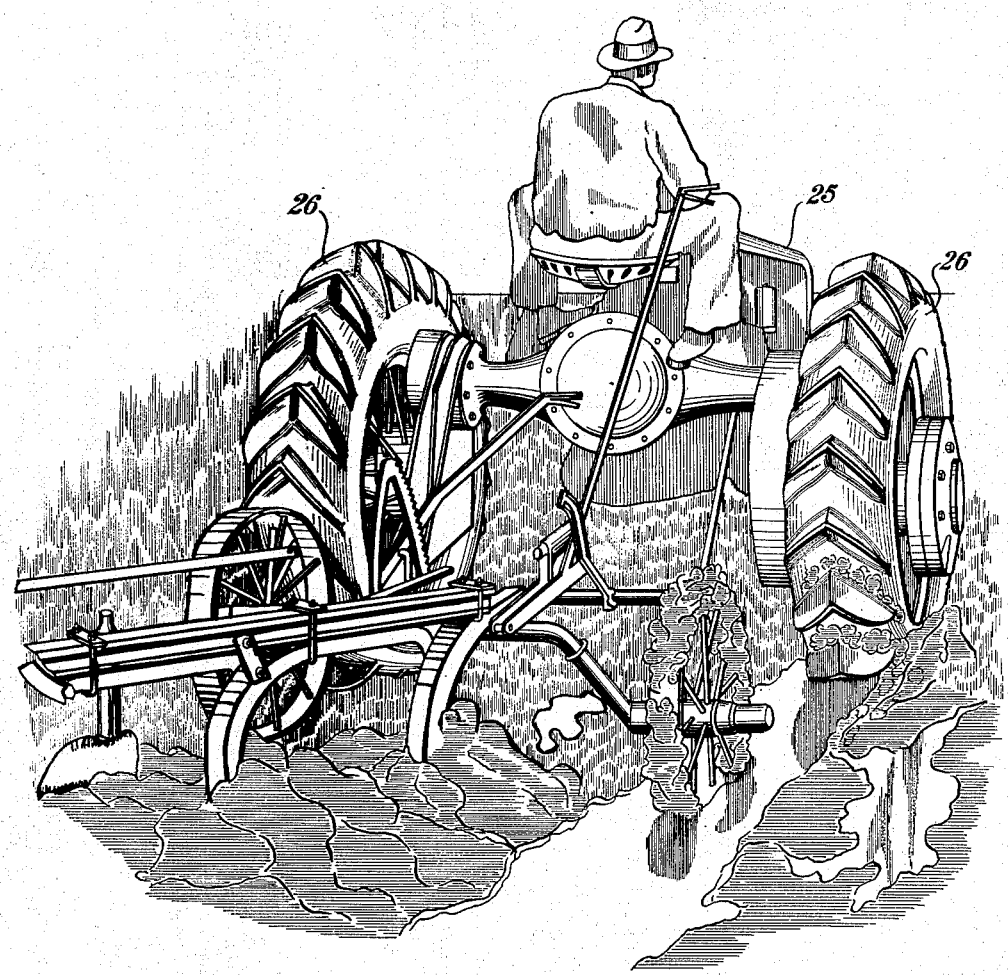
Figure 1 is a view of a tractor equipped with pneumatic tires constituting one embodiment of the invention, as it appears while plowing a rice field.

Referring to Figure 1 of the drawings, there is shown therein a tractor 25 of standard construction, which tractor is equipped with a pair of the improved pneumatic tires 26, 26 mounted upon its driving wheels. The tractor is shown pulling a plow 27 through a rice field, the view clearly illustrating the wet, muddy conditions that obtain and showing the action of the improved tires when operating under such conditions.

Figure 2:
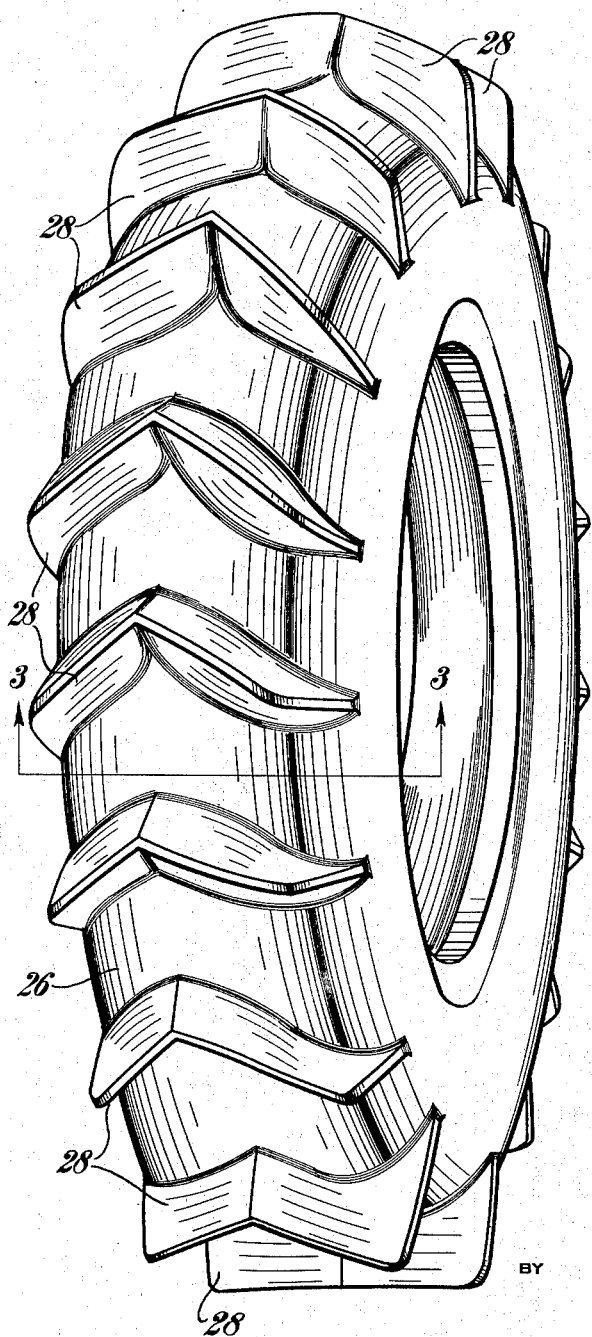
Figure 2 is a perspective view, on a larger scale, of a tire shown in Figure 1.
Figure 3:
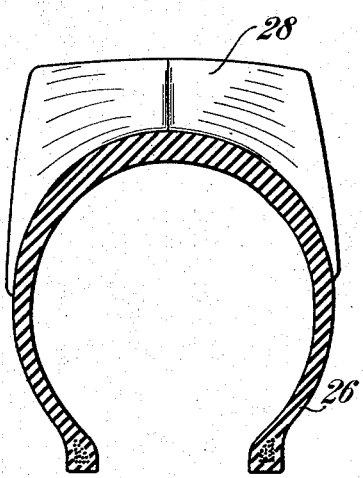
Figure 3 is a section on the line 3—3 of Figure 2.
Figure 4:
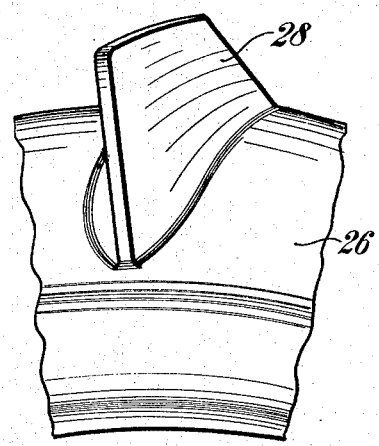
Figure 4 is a fragmentary side elevation of tire shown in Figures 1 and 2.

A tire such as that shown in Figure 1 is shown in detail in Figures 2 to 4 wherein it will be seen that the tire casing is of relatively large cross section as compared to its bead diameter, and has relatively thin walls, the tire being designed to operate at low inflation pressure in the manner of the type sometimes known as "balloon" tires. The tread portion of the tire is formed with a circumferential series of relatively tall, upstanding rubber lugs, cleats or characters 28, 28 herein shown as of angular or "chevron" design, the points or apices of the chevron being disposed in the same direction along the centerline of the tread. The chevron lugs extend from one sidewall of the tire to the other, and their radial dimension constitutes approximately 20% of the total radial height of a transverse section of the tire. In most tires the height, or radial dimension, of the lugs will be about 2½ inches. Circumferentially of the tire, the chevron lugs are relatively widely spaced apart, there being little or no overlap of adjacent chevrons, and no pockets for retaining mud. In transverse section, each lug 28 is tapered from a relatively wide base to a relatively narrow flat top or crest, the arrangement providing a draft that facilitates the withdrawing of the lugs from the mud in which they are designed to operate. The tire 26 is so mounted for use on a tractor that the apices of the lugs 28 are directed forwardly as the tire rotates, the result being that the lugs have a tendency to force the mud laterally outwardly, instead of wedging it into the angle of the lugs as would be the case if the lugs were oppositely directed. The tire will mud up in one revolution if the tractor is run backwards, but will clean immediately when the tractor moves forwardly.

The lugs 28 are rugged and aggressive, and because of their angular design, each leg of each lug provides lateral support for the other leg thereof whereby the lugs are able to withstand severe service. Since the tire operates at low inflation pressure, there will be a substantial flexure in the region thereof that is in contact with the ground, and such flexure provides sufficient relative movement between adjacent lugs as to loosen any mud or soil caked between said lugs. The lugs themselves have at least a modicum of resilience, and slight flexing of the lugs, in combination with the relatively wide spacing between lugs and the tapered cross section of the latter practically assures the ejection of mud from the tire. Because of their relatively large cross section, light body construction, and low inflation, the tires possess a buoyancy that prevents them from sinking deeply into mud, and keeps them near the top, with the result that less power is required for propelling the tractor. The tires are sufficiently resilient to provide easy riding in the fields and on pavements, and they achieve the other advantages set out in the foregoing statement of objects.

Other embodiments of the invention, shown in Figures 5 to 16, differ from that previously described primarily in the arrangement of the traction lugs upon the tread portion of the tires, other characteristics of the invention, such as light construction, large cross section, relatively tall traction lugs, and the tapered section of the latter, being present in all embodiments of the invention.

Referring now to Figures 5 to 7 inclusive, there is shown a tire casing 30 having a tread portion formed with traction lugs 31, 32. The latter are disposed obliquely of the tread, and are arranged in two series, the lugs of one series being disposed substantially at right angles to the lugs of the other series. Each series of lugs extends from one side of the tire tread to a point somewhat past the medial plane of the tire where they intersect respective lugs of the other series. Thus each lug terminates in the medial region of lug from the opposite side of the tire, and itself is the terminus of a lug from the opposite side of the tire. The lugs are relatively widely spaced apart, as in the other embodiments of the invention, to assist in making the tire self-cleaning. The arrangement provides a continuous circumferential zig-zag rib or lug centrally of the tread, which makes for easier riding, especially on hard surface roads, without substantial sacrifice of the other advantageous features of the invention. This tire, like that shown in Figures 1 to 4, is designed to be driven in one direction only, which direction is indicated by the arrow in Figure 5.

The embodiment of the invention shown in Figures 8 to 10 consists of a tire casing 42, the tread portion of which comprises a continuous circumferential rib 43 positioned in the medial plane of the tire, and respective circumferential series of oblique ribs or lugs 44, 45 extending from said central rib 43 to the opposite lateral margins of the tread. The lugs 44 are staggered with relation to the lugs 45, and the lugs of one series are disposed substantially at right angles to the lugs of the other series. The continuous medial rib 43 makes for easy riding, and the tire is self cleaning when driven in the direction indicated by the arrow in Figure 8.

In all of the embodiments shown and described, the lugs have a height that is approximately 20% of the total radial height of a transverse section of the tire, and all lugs have sloping or tapered sides to facilitate their withdrawal from the mud.

Other modifications may be resorted to without departing from the spirit of the invention or the scope of the appended claims.

What is claimed is:

1. In combination with a tractor wheel, a pneumatic tire adapted to operate in soft, muddy soils, said tire consisting of a flexible casing of relatively large section, and having a tread portion formed with integral, somewhat flexible traction lugs arranged in a circumferential series thereon, said lugs having the shape of chevrons that are relatively widely spaced apart so as not to overlap each other, said lugs having a height that is approximately one-fifth of the total radial height of the cross-section of the tire, said tire being so mounted on the wheel that during the forward motion of the vehicle the apices of the chevrons point toward the rear of the wheel so that the tractive effort of the traction lugs will cause the mud to be extruded or forced to the sides of the tire, automatically cleaning same to prevent the space between the lugs becoming clogged with mud.

2. A self-cleaning pneumatic tire adapted for traction in muddy, water soaked or partly submerged soils, said tire comprising a flexible tire casing having a tread comprising two series of bars, the bars of each series being substantially parallel and spaced from each other circumferentially by grooves, the bars of both series being disposed obliquely with respect to the center line of the tire and toward each other so that the bars of the two series converge relatively toward each other in the same direction circumferentially of the tire, and having a height that is at least approximately 20% of a transverse section of the tire, the angularity and circumferential spacing of the bars of either series being such that none of the bars of one series overlap in a circumferential direction, said bars being tapered from a relatively wide base to a relatively narrow crest to facilitate the penetration, withdrawal and self-cleaning action of the tread.

3. A self-cleaning pneumatic tire adapted for traction in muddy, water soaked or partly submerged soils, said tire comprising a flexible tire casing having a tread comprising sets of parallel bars upon opposite sides of the center line of the tread and positioned in opposite diagonal relation to the center line of the tire to form a repetition of V-shaped formations about the tire, the apices of the formations being alternated on opposite sides of the center line of the tire, each bar being extended to connect with an oppositely directed bar, the bars of each series being spaced by unobstructed grooves, some of which extend from the edge of the tread to points beyond the center line of the tire and beyond the ends of the grooves extending from the opposite side, the angularity and circumferential spacing of the bars of either series being such that none of the bars of one series overlap in a circumferential direction, said bars having a height that is at least approximately 20% of a transverse section of the tire and being tapered from a relatively wide base to a relatively narrow crest to facilitate the penetration, withdrawal and self-cleaning action of the tread.

4. In combination with a traction wheel, a self-cleaning pneumatic tire adapted for traction in muddy, water soaked or partly submerged soils, said tire comprising a flexible tire casing having a tread comprising sets of parallel bars upon opposite sides of the center line of the tread and positioned in opposite diagonal relation to the center line of the tire to form a repetition of V-shaped formations about the tire, the apices of the formations being alternated on opposite sides of the center line of the tire, each bar being extended to connect with an oppositely directed bar, the bars of each series being spaced by unobstructed grooves, some of which extend from the edge of the tread to points beyond the center line of the tire and beyond the ends of the grooves extending from the opposite side, the angularity and circumferential spacing of the bars of either series being such that none of the bars of one series overlap in a circumferential direction, said bars having a height that is at least approximately 20% of a transverse section of the tire and being tapered from a relatively wide base to a relatively narrow crest to facilitate the penetration, withdrawal and self-cleaning action of the tread, said tire being so mounted on the wheel that the direction of convergence of said bars is in the direction of rotation for normal operation in the direction of desired maximum traction.

5. In combination with a traction wheel, a self-cleaning pneumatic tire mounted thereon adapted for traction in muddy, water soaked or partly submerged soils, said tire comprising a flexible tire casing having a tread comprising a plurality of parallel bars arranged in two circumferential series, one series extending at least from each side of the tread toward the center line of the tire, having portions converging relatively toward each other in the same direction along the center line of the tire, the height of said bars being at least approximately 20% of a transverse section of the tire, the spacing, angularity and length of the bars of each series being so correlated that none of the bars of either series overlap each other in a circumferential direction, said bars being tapered from a relatively wide base to a relatively narrow crest to facilitate the penetration, withdrawal and cleaning action of the tread, and the tire being so mounted on said wheel that the direction of convergence of said bars is in the direction of the relative shearing action between the tread and the ground for normal operation in the direction of maximum desired traction.

6. A pneumatic traction tire for use on motor vehicles adapted to operate in soft, muddy soils, which tire has a tread portion formed with integral, somewhat flexible transverse traction bars arranged in a circumferential series on the tread thereof and having a height approximately 20% of the total radial height of a transverse section of a tire, the sides of said bars being inclined toward each other outwardly from the body of the tire and terminating to define substantially narrow crests, each of said bars being integrally connected to a reinforcing element for reinforcing said transverse bars in a circumferential direction, the circumferential spacing of the crests of said transverse bars being substantially greater than their height.

7. A self-cleaning pneumatic tire, adapted for traction in muddy, water-soaked, or partly submerged soils, said tire having a tread comprising two series of bars, the bars of each series being substantially parallel and spaced from each other by grooves, the bars of both series having portions disposed obliquely with respect to the center line of the tire and toward each other so that said portions of the bars of the two series converge relatively toward each other in the same direction toward the center of the tire, and having a height that is at least approximately 20% of a transverse section of the tire, the angularity and circumferential spacing of the bars of either series being such that none of the bars of one series overlaps each other in a circumferential direction, said bars being tapered from a relatively wide base to a relatively narrow crest to facilitate the penetration, withdrawal, and self-cleaning action of the tread resulting from the flexing of the bars and the body of the pneumatic tire as the latter comes into contact with, and leaves the ground.

8. A self-cleaning pneumatic tire adapted for traction in muddy, water-soaked, or partly submerged soils, said tire having a tread comprising two series of bars, the bars of each series being substantially parallel and spaced from each other by grooves which are substantially wider than the height of said bars, the bars of both series having portions disposed obliquely with respect to the center line of the tire and extending toward each other so that said portions of the bars of the two series converge relatively toward each other in the same direction toward the center of the tire, and having a height that is at least approximately 20% of a transverse section of the tire, said bars being tapered from a relatively wide base to a relatively narrow crest to facilitate the penetration, withdrawal, and self-cleaning action of the tread resulting from the flexing of the bars and the body of the pneumatic tire as the latter comes into contact with, and leaves the ground.

9. A pneumatic traction tire for use on motor vehicles adapted to operate in soft, muddy soils, said tire comprising a flexible casing having a tread portion formed integrally with somewhat flexible transverse traction elements arranged in circumferential series thereon, said traction elements having a height that is approximately 20% of the total height of the cross section of the tire, the sides of said elements being inclined toward each other outwardly from the body of the tire and terminating to define substantially narrow crests, the circumferential spacing of said elements being substantially greater than their height and circumferential rib means along substantially the center line of the tire tread connected to said traction elements.

10. A pneumatic tire for use on motor vehicles and the like adapted to operate in soft, muddy soils, said tire comprising a flexible casing having a tread portion formed integrally with somewhat flexible transverse traction elements arranged in circumferential series thereon, said traction elements having a height that is approximately 20% of the total radial height of the cross section of the tire, the sides of said elements being inclined toward each other outwardly from the body of the tire and terminating to define substantially narrow crests, the circumferential spacing of said elements being substantially greater than their height, each of said elements consisting of a portion extending from one side wall of the tire toward the other; and a circumferential rib portion disposed at right angles to the axis of said tire, said rib portion being connected with said elements.

11. A pneumatic tire for use on motor vehicles and the like adapted to operate in soft, muddy soils, said tire comprising a flexible casing having a tread portion formed integrally with somewhat flexible traction elements arranged in circumferential series thereon, said traction elements having a height that is approximately 20% of the total radial height of the cross section of the tire, the sides of said elements being inclined toward each other outwardly from the body of the tire and terminating to define substantially narrow crests, the circumferential spacing of said elements being substantially greater than their height, each of said elements extending from one side wall of the tire toward the center line of the tread, and terminating in a circumferential rib extending along the center line of the tread, the elements on one side of said rib being staggered with relation to the elements on the other side thereof.

12. A pneumatic tire as defined in claim 11 in which the flexible traction elements are disposed obliquely with relation to the center line of the tire tread.

13. A pneumatic tire for use on motor vehicles operating in soft, muddy soils, said tire comprising a flexible casing having a tread portion formed integrally with a somewhat flexible traction element having a height that is approximately one-fifth the total radial height of the cross section of the tire, said traction element being continuous circumferentially of the tire and being of zig-zag shape and having a transverse section that tapers from a relatively wide base to a relatively narrow flat top.

14. A pneumatic tire for use on motor vehicles operating in soft, muddy soils, said tire comprising a flexible casing having a tread portion formed integrally with somewhat flexible traction elements comprising a continuous, circumferentially extending, centrally disposed zig-zag rib, and a circumferential series of lugs adjoined to said rib at the arris or external angles thereof and extending laterally therefrom to the respective adjacent lateral margin of the tread, said traction elements being of a height that is approximately one-fifth the total radial height of the cross section of the tire and having their respective lateral faces sloped toward each other outwardly from their base.

15. A pneumatic tire for use on motor vehicles operating in soft, muddy soils, said tire comprising a flexible casing having a tread portion formed with two series of lugs disposed transversely of the tire tread and extending from a region at one side of the centerline of the tread to the respective lateral margins thereof, the lugs on one side of the tread being in staggered relation to those on the other side of the tread, and a centrally disposed circumferential zig-zag rib on the tread adjoined to the inner ends of said lugs, said lugs and rib having a transverse section that tapers from a relatively wide base to a relatively narrow flat top.

16. A combination as defined in claim 15 in which the lugs are disposed obliquely with relation to the centerline of the tire tread.

JAMES E. HALE.